(12) United States Patent
Arunachalam

(10) Patent No.: US 7,474,719 B2
(45) Date of Patent: Jan. 6, 2009

(54) CHANNEL-DEPENDENT DE-SENSING OF RECEIVED SIGNALS

(75) Inventor: Sridhar Arunachalam, Plainsboro, NJ (US)

(73) Assignee: Andrew LLC, Hickory, NC (US)

( * ) Notice: Subject to any disclaimer, the term of this patent is extended or adjusted under 35 U.S.C. 154(b) by 619 days.

(21) Appl. No.: 11/145,622

(22) Filed: Jun. 6, 2005

(65) Prior Publication Data

US 2006/0274865 A1 Dec. 7, 2006

(51) Int. Cl.
*H04L 27/08* (2006.01)
(52) U.S. Cl. ...................................... 375/345
(58) Field of Classification Search .................. 375/345
See application file for complete search history.

(56) References Cited

U.S. PATENT DOCUMENTS 6,496,546 B1 * 12/2002 Allpress et al. ............. 375/316
6,914,950 B1 * 7/2005 Luneau ....................... 375/347
2006/0246861 A1 * 11/2006 Dosanjh et al. ............. 455/147

OTHER PUBLICATIONS

Joy Laskar, Babak Matinpour, Sudipto Chakraborty, "Modern Receiver Front-Ends," Published Mar. 18, 2004, John Wiley & Sons; Chapter 2.*
Analog Devices, "AD6636 150 MSPS, Wideband, Digital Downconverter (DDC)," Data Sheet, Rev A, Jun. 1, 2005, www.analog.com.*

* cited by examiner

*Primary Examiner*—David C. Payne
*Assistant Examiner*—Nader Bolourchi
(74) *Attorney, Agent, or Firm*—Mendelsohn & Associates, PC; Steve Mendelsohn

(57) ABSTRACT

A processor capable of independently adding a specified level of noise to each different frequency-based channel signal of a composite signal, where the specified levels of noise for at least two channel signals are different. In one embodiment, the processor operates in the digital domain after the composite signal can been channelized using a single set of time-multiplexed circuitry for all channel signals.

18 Claims, 3 Drawing Sheets

CHANNEL-DEPENDENT DE-SENSING OF RECEIVED SIGNALS

FIELD OF THE INVENTION

The present invention relates to signal processing, and, in particular, to techniques for de-sensing received signals.

BACKGROUND OF THE INVENTION

De-sensing refers to the process of a receiver purposely adding noise to a received signal, e.g., to characterize the capabilities of a communication system to operate in the presence of different noise levels. De-sensing has traditionally been performed in the analog domain, but such analog de-sensing does not support the independent addition of noise into individual carriers of frequency-based signal channels.

There are digital down-converters (DDCs) that provide a de-sense function by injecting a pseudo-noise (PN) sequence in the digital domain at intermediate frequency (IF) after mixing, but prior to channelization and automatic gain control (AGC), but these DDCs do not support individual per-carrier adjustment of the noise level.

BRIEF DESCRIPTION OF THE DRAWINGS

Aspects, features, and advantages of the present invention will become more fully apparent from the following detailed description, the appended claims, and the accompanying drawings in which like reference numerals identify similar or identical elements.

DETAILED DESCRIPTION

Figure 1:
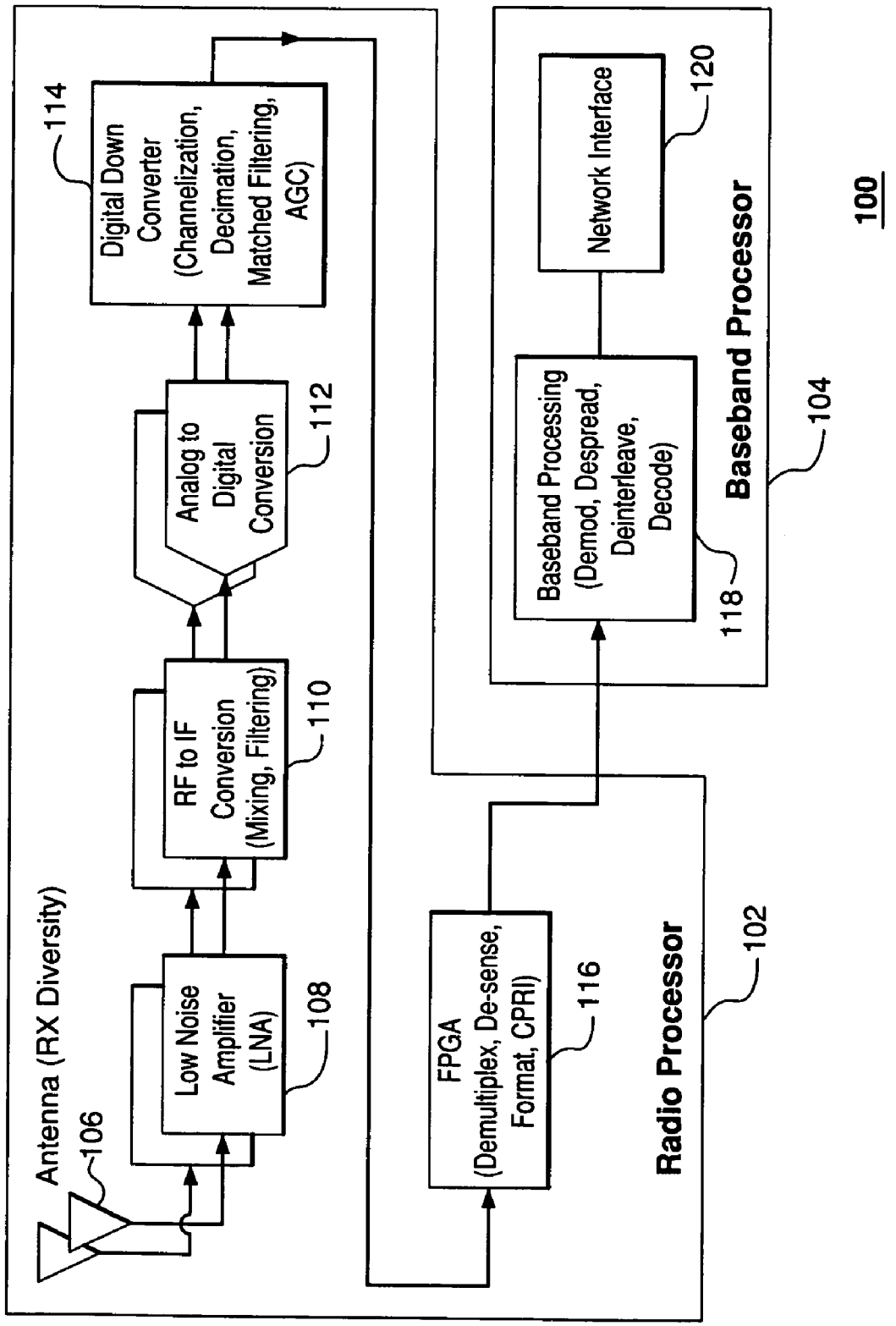
FIG. 1 is a block diagram of a receiver, according to one embodiment of the present invention.

FIG. 1 is a block diagram of a wideband receiver 100, according to one embodiment of the present invention. Receiver 100 may be employed at the base station of a wireless communication network, such as a cellular telephone network having many base stations interconnected via central offices. Receiver 100 has radio processor 102 and baseband processor 104.

Radio processor 102 receives radio frequency (RF) signals transmitted over the air from one or more wireless units (e.g., mobile phones). During normal operations, radio processor 102 typically receives multiple RF signals transmitted by multiple wireless units, where each RF signal may be distinguished from other RF signals based on one or more signal characteristics, such as frequency, timing, phase, and/or code. Radio processor 102 processes the received RF analog signals to provide baseband digital signals to baseband processor 104, which further processes the digital signals and provides resulting digital signals to another node in the wireless communication network (e.g., a central office).

As shown in FIG. 1, radio processor 102 has two parallel sets of front-end circuitry that provide receiver 100 with signal-processing diversity. In particular, radio processor 102 has two antennas 106, two low-noise amplifiers (LNAs) 108, two RF-to-IF converters 110, and two analog-to-digital converters (ADCs) 112. Each antenna 106 receives a different version of a composite (e.g., multi-carrier) RF signal corresponding to a combination of the RF signals transmitted from the wireless units, each LNA 108 amplifies the corresponding received composite RF signal, each RF-to-IF converter 110 performs mixing and filtering to convert the amplified, received composite RF signal to IF, and each ADC 112 digitizes the analog IF signal.

Digital down-converter (DDC) 114 performs channelization, decimation, matched filtering, and automatic gain control (AGC) on the two digital IF signals from ADCs 112 to generate a different digital signal for each different carrier in the original received composite RF signals. These digital signals are provide to field-programmable gate array (FPGA) 116, which demultiplexes, de-senses, and formats the digital signals, e.g., according to the Common Protocol Radio Interface (CPRI) standard.

The digital signals generated by FPGA 116 are provided to baseband processor 104, which performs one or more of demodulation, de-spreading, de-interleaving, and decoding (118) to generate the digital signals that are forwarded on to other parts of the network via network interface 120.

Figure 2:
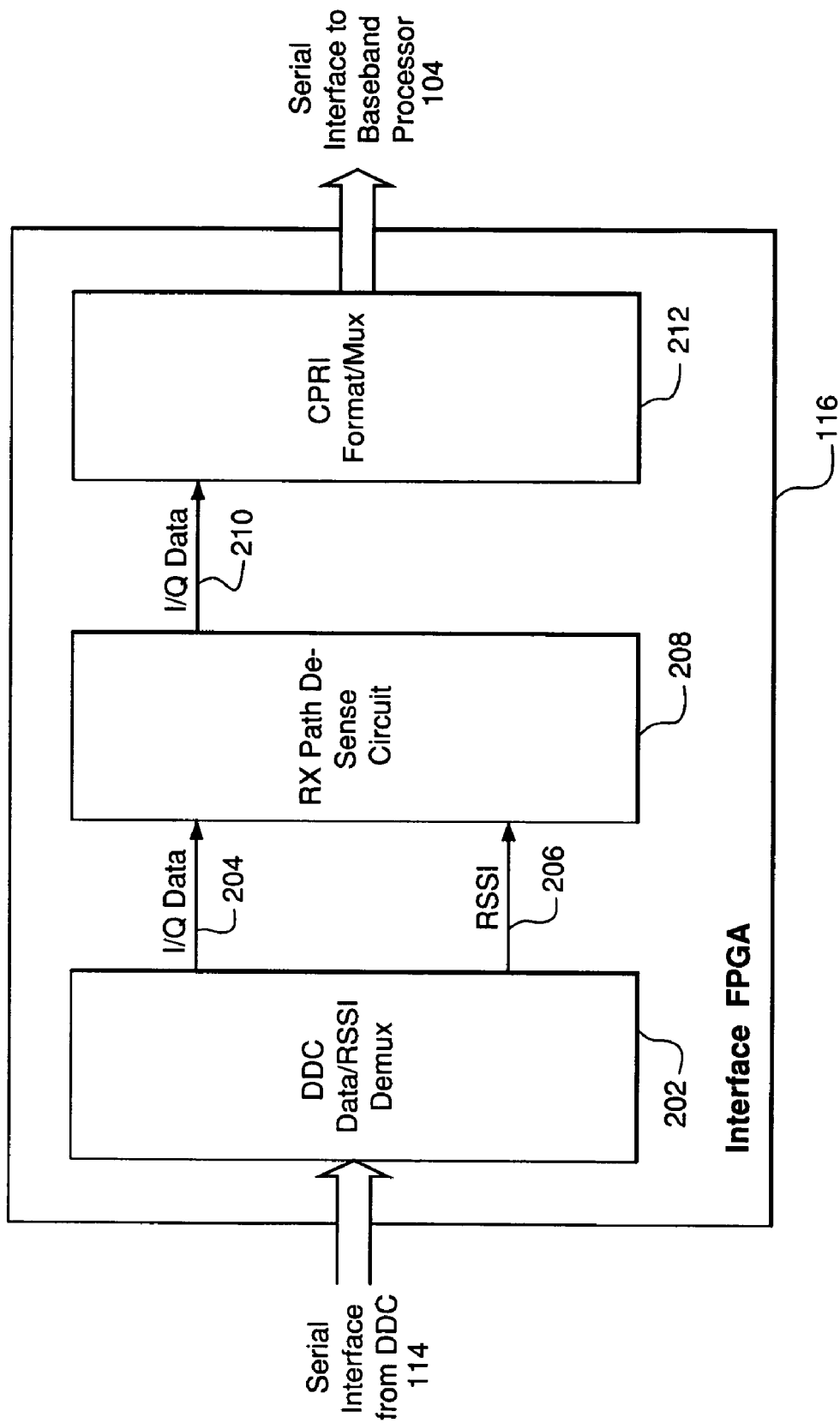
FIG. 2 is a block diagram showing the functions implemented by the FPGA of FIG. 1.

FIG. 2 is a block diagram showing the functions implemented by FPGA 116 of FIG. 1. DDC 114 of FIG. 1 generates a serial stream of digital data in which data corresponding to different frequency channels (i.e., corresponding to different RF carriers in the original received composite RF signals) and different receive antennas are time-multiplexed in the serial stream. In addition to the channel data (i.e., in-phase (I) and quadrature (Q) data for each channel and each antenna), the serial stream also includes RSSI (received signal strength indication) data identifying the signal strength (in dB) of each different received RF channel at each antenna, as measured at receiver 100.

DDC data/RSSI demux circuit 202 demultiplexes the serial stream received from DDC 114 to provide separated I/Q data stream 204 and RSSI stream 206 to de-sense circuit 208, which independently adds specified levels of internally generated noise to the I/Q data corresponding to different RF channels. The resulting de-sensed I/Q data stream 210 is provided to CPRI format/mux circuit 212, which formats and multiplexes I/Q data stream 210 for further processing by baseband processor 104 of FIG. 1.

Figure 3:
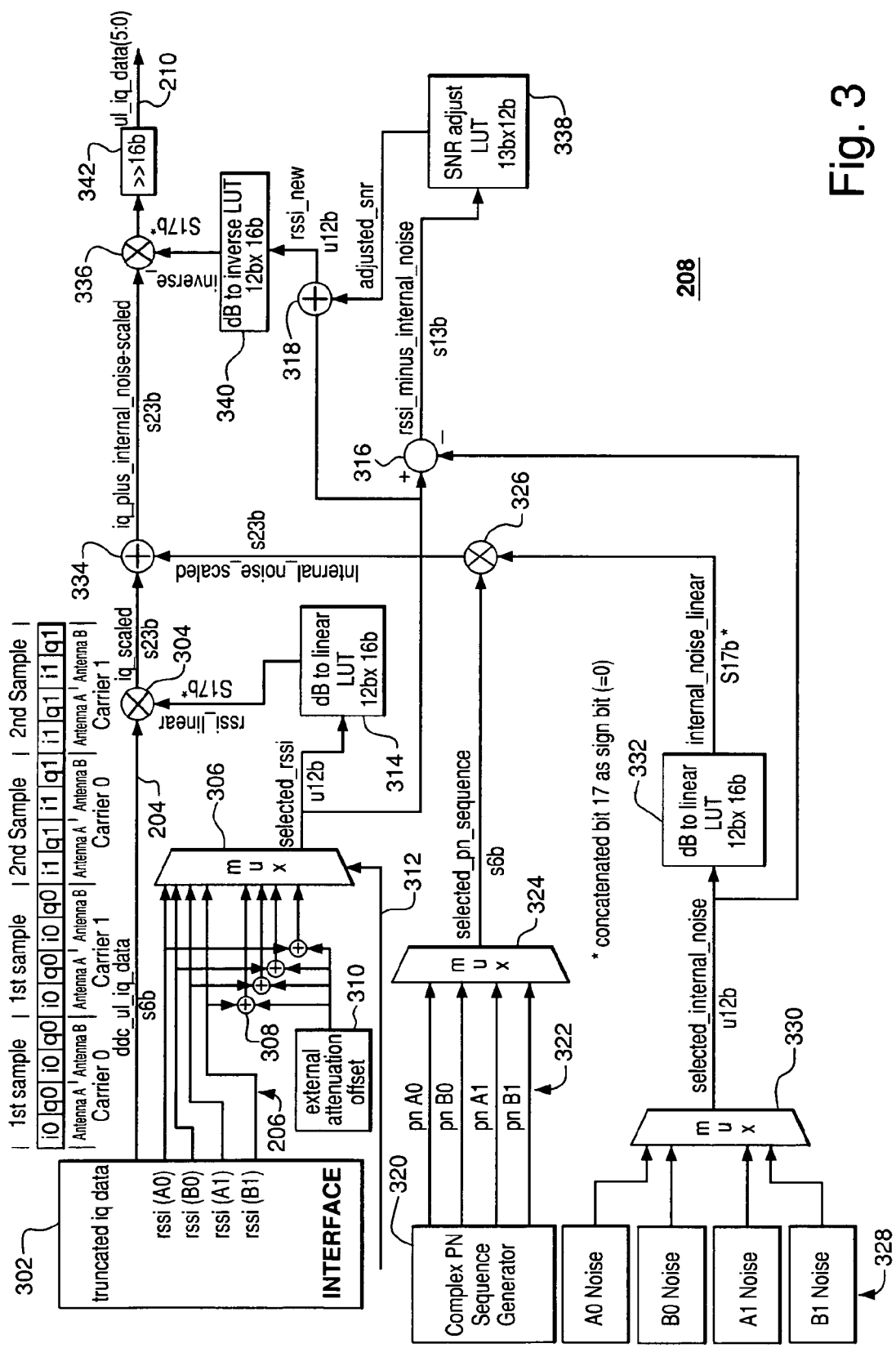
FIG. 3 is a block diagram of the de-sense circuit of FIG. 2, according to one possible embodiment of the present invention.

FIG. 3 is a block diagram of de-sense circuit 208 of FIG. 2, according to one possible embodiment of the present invention. This particular embodiment corresponds to a situation in which the received RF signals correspond to two different carriers: Carrier 0 and Carrier 1, where each antenna (i.e., Antenna A and Antenna B) receives a composite RF signal corresponding to both carriers.

FIG. 3 indicates the time-multiplexing of four sets of I and Q data (corresponding to the two carriers and two antennas) contained in I/Q data stream 204 from demux circuit 202 of FIG. 2. As shown, I/Q data stream 204 comprises a first sample of both I and Q of Carrier 0 received at Antenna A, followed by a first sample of both I and Q of Carrier 0 received at Antenna B, a first sample of both I and Q of Carrier 1 received at Antenna A, followed by a first sample of both I and Q of Carrier I received at Antenna B, and so on, for subsequent samples of each carrier received at each antenna.

According to this embodiment, certain circuitry in de-sense circuit 208 is time-multiplexed to process the four different sets of data. As described below, this time-multiplexed circuitry includes look-up tables (LUTs) 314, 332, 338, and 340, multipliers 304, 326, and 336, addition/subtraction nodes 316, 318, and 334 and shift register 342. This time-multiplexed circuitry is used to sequentially process the eight different sets of data corresponding to the eight different combinations of data I/Q, Antennas A/B, and Carriers 0/1.

Interface 302 provides I/Q data stream 204 containing the four sets of time-multiplexed I/Q data from demux circuit 202 of FIG. 2 to multiplier 304, where each I and Q value is represented by a 6-bit, signed binary number. Interface 302 also demultiplexes RSSI stream 206 to form four separated RSSI streams (A0, B0, A1, and B1), each corresponding to a different carrier/antenna combination. Each of these RSSI streams is provided to both multiplexer 306 and a corresponding summation node 308. Each summation node 308 adds an externally specified attenuation offset value stored in register 310 to the corresponding RSSI value. The purpose of this offset value is to adjust the "raw" RSSI values as necessary when attenuators are used to increase the dynamic range of ADCs 112 of FIG. 1. The resulting "compensated" RSSI value from each summation node 308 is also provided to mux 306.

One-bit control signal 312 is a time-multiplexed signal that controls mux 306 to select either the raw or the compensated RSSI values, for each antenna sequentially. Not explicitly shown in FIG. 3 is a second control signal that controls mux 306 to sequentially select RSSI values corresponding to the four different sets of I/Q data. (Analogous control signals for other multiplexers in FIG. 3 are also not explicitly shown in the figure.) Each selected RSSI value is provided to LUT 314, subtraction node 316, and summation node 318 as a 12-bit, unsigned binary number.

LUT 314 is a (12-bit by 16-bit) table that maps each different possible 12-bit RSSI digital value (RSSI) (representing dB) to its corresponding 16-bit linear value ($RSSI_{linear}$), where the 16-bit unsigned binary value is extended to a 17-bit signed binary value whose sign bit is 0. The mapping of LUT 314 corresponds to Equation (1) as follows:

$$RSSI_{linear} = Q\left(10^{\left(\frac{RSSI*\alpha+\beta}{20}\right)}\right), \quad (1)$$

where $\alpha$ is a conversion factor from digital level to dB (e.g., 0.235 dB/level), $\beta$ is a dynamic range optimization factor (e.g., 120), and $Q(.)$ indicates quantization. The resulting 17-bit, signed RSSI values are applied to multiplier 304 to scale the corresponding I/Q values in stream 204. Not shown in FIG. 3 is buffering that ensures that the appropriate I/Q values are multiplied by the corresponding RSSI values as well as other buffering that ensures that other sets of values are properly synchronized at other (e.g., multiplier, summation, subtraction) nodes. Multiplier 304 essentially un-does (i.e., reverses) the AGC processing performed in DDC 114 of FIG. 1.

Complex PN sequence generator 320 generates four complex pseudo-noise sequences 322, one for each combination of Carriers 0/1 and Antennas A/B. These four PN sequences 322 are applied to mux 324, which selects an appropriate one to apply to multiplier 326 as a 6-bit, signed binary number. In one implementation, each complex PN sequence is a random sequence of complex values equal to $\pm 9 \pm 9j$.

Registers 328 contain externally specified noise levels (in digital levels representing dB) for each of the four different data streams (A0, B0, A1, B1). The four different noise levels are applied to multiplexer 330, which selects an appropriate one to apply to both LUT 332 and subtraction node 316. Like LUT 314, LUT 332 is a (12-bit by 16-bit) table that maps each different possible 12-bit noise value in dB to its corresponding 16-bit linear value, where the 16-bit unsigned binary value is extended to a 17-bit signed binary value where the sign bit is zero. The resulting 17-bit, signed noise values are applied to multiplier 326, which scales the corresponding PN sequence values from mux 324.

The resulting simulated, 23-bit, signed, internally generated noise values from multiplier 326 are added at summation node 334 to the corresponding 23-bit, signed scaled I/Q values from multiplier 304. The resulting 23-bit, signed, noise-scaled I/Q values are applied to multiplier 336. (Note that, in this implementation, the ranges of expected values of the two 23-bit inputs to summation node 334 ensure that the result of the summation is not a 24-bit value.)

In order to provide baseband processor 104 with appropriate I/Q and RSSI data, the AGC processing that was un-done by multiplier 304 needs to be re-done. One way to re-do the AGC processing would be to divide the noise-scaled I/Q data generated at summation node 334 by RSSI values corresponding to the RSSI values applied by multiplier 304 as adjusted for the level of the internally added noise. For example, if x is the linear RSSI value apply by multiplier 304 and y is the linear representation of the internally added noise value, then re-doing the AGC processing would involve dividing the noise-scaled I/Q values by $\sqrt{x^2+y^2}$, when the standard deviation of the unscaled noise is equivalent to the standard deviation of the I/Q inputs. However, division operations are typically expensive to implement (in terms of complexity, processing time, and/or layout).

Instead, division by a particular divisor value may be implemented by multiplication by the reciprocal (i.e., inverse) of that divisor value. As described in the following paragraphs, de-sense circuit 208 takes advantage of this mathematical relationship by implementing the division function to re-do the AGC processing as a combination of an appropriate (inverse scaling) multiplication operation and a corresponding bit-shift operation. As an example, in the decimal domain, division by 2 can be implemented by a multiplication by 5 and a shift of one decimal place to the right (corresponding to dividing by 10 in the decimal domain). Thus, 6 divided by 2 can be implemented as ((6 times 5) followed by a decimal-based right shift). In FIG. 3, subtraction node 316 subtracts the selected noise levels (Noise in dB) from mux 330 from the selected RSSI values (RSSI in dB) from mux 306 to generate 13-bit, signed data coffesponding to the RSSI level minus the added internal noise, which data are applied to LUT 338. LUT 338 is a (13 bit by 12 bit) table that maps each different possible 13-bit RSSI- minus-noise value in dB to a coffesponding 12-bit value representing the adjusted signal-to-noise ratio (adjustedSNR) in dB. The mapping of LUT 338 coffesponds to Equation (2) as follows:

$$adjustedSNR = Q\left(\frac{10\log_{10}(1+10^{(-SNR/10)})}{\alpha}\right), \quad (2)$$

where:

$$SNR = (RSSI-\text{Noise})*\alpha.$$

LUT 338 determines how much (in digital level representing dB) the divisor value coffesponding to the binary RSSI value applied at multiplier 304 needs to change to adjust for the internally added noise. This adjusted SNR value is added to the selected RSSI value from mux 306 at summation node 318 to generate 12-bit, unsigned data corresponding to a new RSSI value, which is applied to LUT 340.

LUT 340 is a (12 bit by 16 bit) table that maps each different possible 12-bit new RSSI value ($RSSI_{new}$ in dB) to a 16-bit binary value corresponding to the inverse of the new RSSI value, where the 16-bit unsigned binary value is extended to a 17-bit signed binary value (inverse) whose sign bit is zero. LUT 340 may be thought of as a combination of a first mapping from RSSI values in dB to linear RSSI values (e.g., according to Equation (1)) and a second mapping from linear RSSI values to binary values representing the reciprocals of the linear RSSI values. The mapping of LUT 340 corresponds to Equation (3) as follows:

$$\text{inverse} = Q\left(\frac{2^{16}-1}{10^{\left(\frac{RSSI_{new}*\alpha+\beta}{20}\right)}}\right). \quad (3)$$

Multiplier 336 multiplies the noise-scaled I/Q data from summation node 334 by the inverse values from LUT 340, and bit-shifter 342 performs a 16-bit arithmetic shift to the right on the resulting 40-bit, signed data. The 6 LSBs in the data generated by bit-shifter 342 correspond to I/Q data stream 210 provided to CPRI format/mux circuit 212 of FIG. 2.

As described, de-sense circuit 208 of FIG. 3 enables each of four different sets of data (corresponding to the four different combinations of Antennas A/B and Carriers 0/1) to have its own unique level of internally added noise. As such, de-sense circuit 208 provides channel-dependent de-sensing capabilities, in addition to providing antenna-dependent de-sensing capabilities.

One difference between LUT 314 and LUT 332 is that the $0^{th}$ term in LUT 332 is populated with a zero value. This enables the additive noise component at summation node 334 to be selectively turned off (e.g., when de-sensing is not wanted) by storing zeros in noise registers 328. These zero values in noise registers 328 will produce the desired results in elements 316, 318, 336, 338, 340, and 342.

Although the present invention has been described in the context of a particular implementation, other embodiments are possible. For example, other embodiments may be designed for numbers of carriers other than two and/or numbers of receive antennas other than two (including one).

Although the implementation of FIG. 3 relies on time-multiplexing of certain circuitry, the present invention can also be implemented using multiple instances of that circuitry, with as many as one instance for each different set of data processed.

Although the present invention has been described in the context of a specific implementation of a de-sense circuit having different binary data values of specific bit lengths and types (i.e., signed/unsigned), those skilled in the art will understand that the present invention can be implemented in other contexts having data of different bit lengths and/or types. This applies as well to the sizes of the different LUTs and shift registers. Moreover, it may be possible to implement the functions of one or more of the LUTs using circuitry that implements closed-form expressions corresponding to the LUTs (e.g., Equations (1), (2), and/or (3)).

Although the present invention has been described in the context of a receiver in which de-sensing is implemented by an FPGA along with other functions (i.e., demultiplexing and CPRI formatting). In other embodiments, one or more of these functions may be implemented using other types of processors, including application-specific integrated circuits (ASICs), microprocessors, mask-programmable gate arrays (MPGAs), and/or other programmable logic devices (PLDs).

Embodiments of the present invention may be implemented as circuit-based processes, including possible implementation on a single integrated circuit (such as an ASIC or an FPGA), a multi-chip module, a single card, or a multi-card circuit pack. As would be apparent to one skilled in the art, various functions of circuit elements may also be implemented as processing steps in a software program. Such software may be employed in, for example, a digital signal processor, micro-controller, or general-purpose computer.

It will be further understood that various changes in the details, materials, and arrangements of the parts which have been described and illustrated in order to explain the nature of this invention may be made by those skilled in the art without departing from the scope of the invention as expressed in the following claims.

What is claimed is:

1. A method for de-sensing a composite signal having a plurality of frequency-based channels, the method comprising:
    (a) channelizing the composite signal to generate a plurality of channel signals, each channel signal corresponding to a different carrier frequency in the composite signal;
    (b) independently adding a specified level of noise to each channel signal to generate a de-sensed channel signal, wherein the specified levels of noise for at least two channel signals are different; and
    (c) processing each de-sensed channel signal to enable characterization of effect of the added noise, wherein;
        step (a) further comprises performing automatic gain control (AGC) processing;
        step (b) comprises, for each channel signal:
            (1) processing the channel signal to undo the AGC processing to generate a scaled channel signal;
            (2) adding the specified level of noise to the scaled channel signal to generate a noise-scaled channel signal; and
            (3) processing the noise-scaled channel signal to redo the AGC processing to generate the de-sensed channel signal.

2. The invention of claim 1, wherein:
    each channel signal has corresponding signal strength data;
    step (b)(1) comprises multiplying the channel signal based on the corresponding signal strength data to generate the scaled channel signal;
    step (b)(3) comprises inverse scaling the noise-scaled channel signal based on both the corresponding signal strength data and the specified level of added noise to generate the de-sensed channel signal.

3. The invention of claim 2, wherein:
    the signal strength data is expressed in dB as part of the channel signal;
    the specified level of noise is expressed in dB;
    step (b)(1) comprises:
        (i) converting the signal strength data from dB to linear units; and
        (ii) multiplying the channel signal by the signal strength data in linear units to generate the scaled channel signal;
    step (b)(2) comprises:
        (i) converting the specified level of noise from dB to linear units;
        (ii) multiplying the specified level of noise in linear units by random data to generate randomized noise in linear units; and
        (iii) adding the randomized noise in linear units to the channel signal to generate the noise-scaled channel signal; and step (b)(3) comprises:
(i) subtracting the specified level of noise in dB from the signal strength data in dB to generate signal-minus-noise data in dB;
(ii) converting the signal-minus-noise data in dB to signal-to-noise (SNR) adjustment data in dB;
(iii) adding the SNR adjustment data in dB to the signal strength data in dB to generate new signal strength data in dB;
(iv) converting the new signal strength data in dB to corresponding inverted scaling data in linear units; and
(v) multiplying the noise-scaled channel signal by the inverted scaling data and applying arithmetic bit-shifting to generate the de-sensed channel signal.

4. The invention of claim 3, wherein each converting step is implemented using a look-up table (LUT).

5. The invention of claim 1, wherein:
step (a) is implemented in a digital down converter (DDC);
step (b) is implemented in a digital domain on a processor; and
step (c) is implemented in a baseband processor.

6. The invention of claim 5, wherein step (b) is implemented in a field-programmable gate array (FPGA).

7. The invention of claim 1, wherein at least part of step (b) is implemented for all of the channel signals using a single set of time-multiplexed circuitry.

8. The invention of claim 1, wherein step (c) comprises processing each de-sensed channel signal to recover data from the de-sensed channel signal.

9. A processor for de-sensing a composite signal having a plurality of frequency-based channels in a receiver adapted to channelize the composite signal, upstream of the processor, to generate a plurality of channel signals, each channel signal corresponding to a different carrier frequency in the composite signal, wherein:
the processor is adapted to independently add a specified level of noise to each channel signal to generate a de-sensed channel signal, wherein the specified levels of noise for at least two channel signals are different; and
the receiver is further adapted to process each de-sensed channel signal to enable characterization of effect of the added noise, wherein:
the receiver is adapted to perform AGC processing upstream of the processor;
for each channel signal, the processor comprises:
(1) means for processing the channel signal to undo the AGC processing to generate a scaled channel signal;
(2) means for adding the specified level of noise to the scaled channel signal to generate a noise-scaled channel signal; and
(3) means for processing the noise-scaled channel signal to redo the AGC processing to generate the de-sensed channel signal.

10. The invention of claim 9, wherein:
each channel signal has corresponding signal strength data;
the processor is adapted to undo the AGC processing by multiplying the channel signal based on the corresponding signal strength data to generate the scaled channel signal;
the processor is adapted to redo the AGC processing by inverse scaling the noise-scaled channel signal based on both the corresponding signal strength data and the specified level of added noise to generate the de-sensed channel signal.

11. The invention of claim 10, wherein:
the signal strength data is expressed in dB as part of the channel signal;
the specified level of noise is expressed in dB;
the processor is adapted to undo the AGC processing by:
(i) converting the signal strength data from dB to linear units; and
(ii) multiplying the channel signal by the signal strength data in linear units to generate the scaled channel signal;
the processor is adapted to add the specified level of noise by:
(i) converting the specified level of noise from dB to linear units;
(ii) multiplying the specified level of noise in linear units by random data to generate randomized noise in linear units; and
(iii) adding the randomized noise in linear units to the channel signal to generate the noise-scaled channel signal; and
the processor is adapted to redo the AGC processing by:
(i) subtracting the specified level of noise in dB from the signal strength data in dB to generate signal-minus-noise data in dB;
(ii) converting the signal-minus-noise data in dB to SNR adjustment data in dB;
(iii) adding the SNR adjustment data in dB to the signal strength data in dB to generate new signal strength data in dB;
(iv) converting the new signal strength data in dB to corresponding inverted scaling data in linear units; and
(v) multiplying the noise-scaled channel signal by the inverted scaling data and applying arithmetic bit-shifting to generate the de-sensed channel signal.

12. The invention of claim 11, wherein the processor uses a LUT to implement each conversion.

13. The invention of claim 9, wherein:
the receiver comprises a DDC adapted to channelize the composite signal;
the processor is adapted to operate in a digital domain; and
the receiver further comprises a baseband processor adapted to process each de-sensed channel signal.

14. The invention of claim 13, wherein the processor is an FPGA.

15. The invention of claim 9, wherein the processor comprises time-multiplexed circuitry adapted to operate on all of the channel signals.

16. A radio processor comprising:
front-end circuitry adapted to receive and process a composite signal having a plurality of frequency-based channels;
a DDC adapted to channelize the composite signal to generate a plurality of channel signals, each channel signal corresponding to a different carrier frequency in the composite signal; and
a processor adapted to independently add a specified level of noise to each channel signal to generate a de-sensed channel signal, wherein the specified levels of noise for at least two channel signals are different; and
a baseband processor adapted to process each de-sensed channel signal to enable characterization of effect of the added noise, wherein:
the DDC is adapted to perform AGC processing upstream of the processor;
for each channel signal, the processor is adapted to (1) process the channel signal to undo the AGC processing to generate a scaled channel signal;
(2) add the specified level of noise to the scaled channel signal to generate a noise-scaled channel signal: and
(3) process the noise-scaled channel signal to redo the AGC processing to generate the de-sensed channel signal.

17. The invention of claim 16, wherein the front-end circuitry is adapted to process a plurality of versions of the composite signal received at a plurality of receive antennas associated with the radio processor.

18. A receiver comprising:
a radio processor comprising:
front-end circuitry adapted to receive and process a composite signal having a plurality of frequency-based channels;
a DDC adapted to channelize the composite signal to generate a plurality of channel signals, each channel signal corresponding to a different carrier frequency in the composite signal; and
a processor adapted to independently add a specified level of noise to each channel signal to generate a de-sensed channel signal, wherein the specified levels of noise for at least two channel signals are different; and
a baseband processor adapted to process each de-sensed channel signal to enable characterization of effect of the added noise, wherein:
the DDC is adapted to perform AGC processing upstream of the processor;
for each channel signal, the processor is adapted to
(1) process the channel signal to undo the AGC processing to generate a scaled channel signal;
(2) add the specified level of noise to the scaled channel signal to generate a noise-scaled channel signal; and
(3) process the noise scaled channel signal to redo the AGC processing to generate the de-sensed channel signal.

\* \* \* \* \*